United States Patent

Everett et al.

[15] 3,636,336

[45] Jan. 18, 1972

[54] DIGITAL FUNCTION GENERATOR FOR COLLISION AVOIDANCE SYSTEM

[72] Inventors: Samuel R. Everett, Fort Lauderdale; Wayne G. Shear, Pompano Beach; Jorge E. Ardila, Fort Lauderdale, all of Fla.

[73] Assignee: The Bendix Corporation

[22] Filed: Sept. 16, 1969

[21] Appl. No.: 858,412

[52] U.S. Cl. ....................235/197, 235/92 EV, 235/150.23, 235/152

[51] Int. Cl. ....................G06b 15/34, G06b 15/48

[58] Field of Search ....................235/150.53, 150.5, 150.51, 235/150.52, 150.3, 197, 92, 152

[56] References Cited

UNITED STATES PATENTS

| | | | |
|---|---|---|---|
| 3,096,433 | 7/1963 | Daspit et al. | 235/150.23 |
| 3,264,457 | 8/1966 | Seegmiller et al. | 235/150.53 |
| 3,327,100 | 6/1967 | Slavin | 235/92 MC UX |
| 3,497,683 | 2/1970 | Jordan et al. | 235/92 PE UX |
| 3,496,562 | 2/1970 | Smith | 235/92 PE UX |
| 3,500,022 | 3/1970 | Toscano | 235/92 EV UX |

*Primary Examiner*—Joseph F. Ruggiero

*Attorney*—Plante, Arens, Hartz, Hix & Smith, Bruce L. Lamb and William G. Christoforo

[57] ABSTRACT

Each pulse in a pulse train resets a counter to a predetermined initial state. A frequency generator generates a plurality of timing signals each of which comprises a different predetermined frequency. A gating means controlled by the state of the counter selects one of the timing signals to count down the counter. The state of the counter at the time of counter reset is thus related to the pulse repetition frequency of the pulses. Scaling of the system parameters permits the system to generate a sequence of straight line segments which approximate a desired function. In particular, proper scaling of the system parameters permits the system to operate as a digital altitude rate generator if the pulses represent fixed values of altitude change.

9 Claims, 7 Drawing Figures

INVENTORS
WAYNE G. SHEAR
JORGE E. ARDILA
SAMUEL ROGER EVERETT
BY William G. Christoforo
ATTORNEY

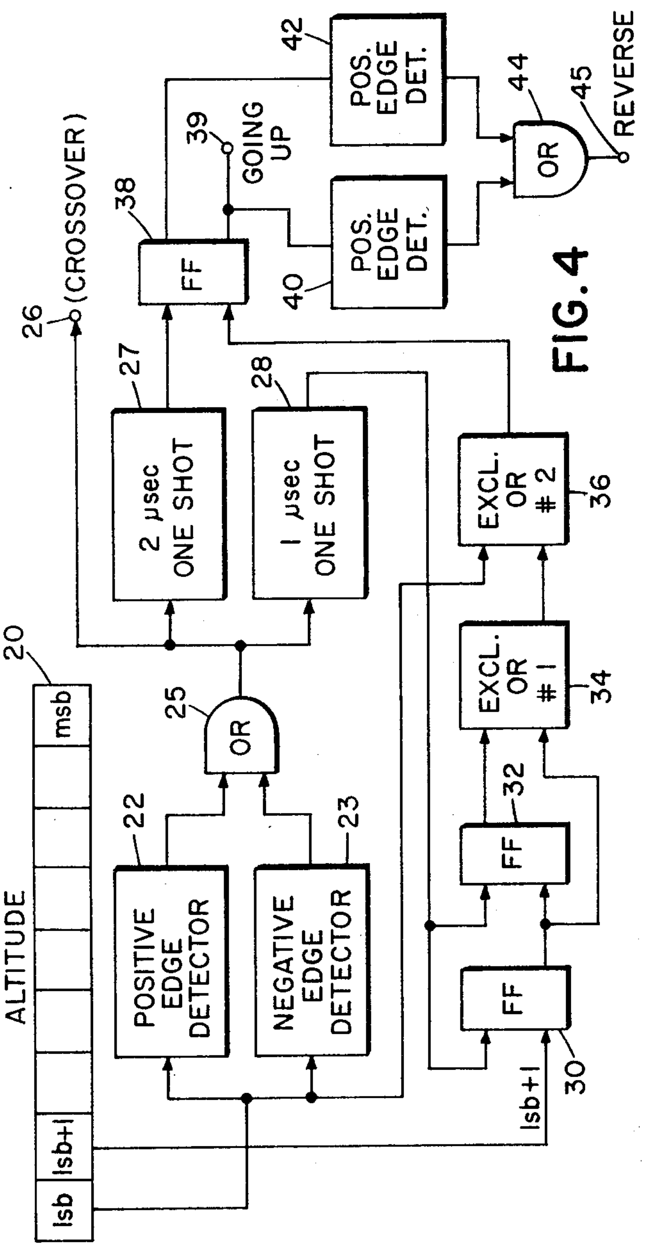
FIG. 4
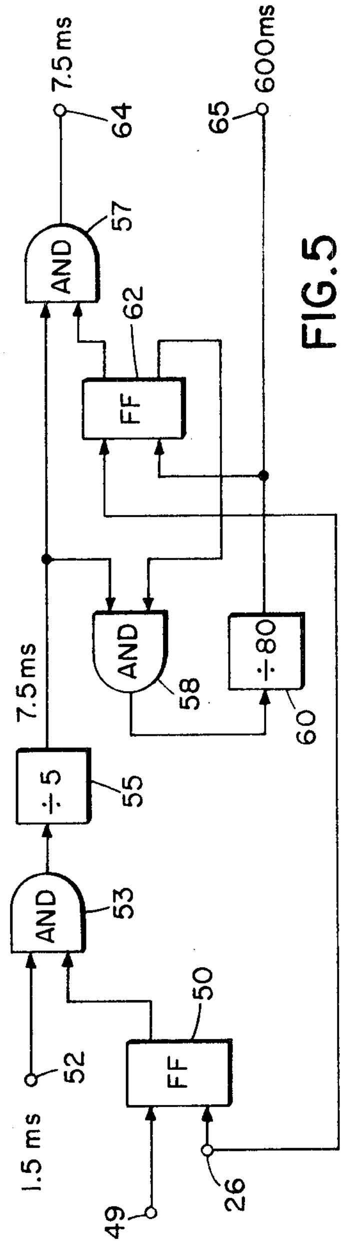
FIG. 5
| TRUTH TABLE | | |
|---|---|---|
| lsb | lsb+1 UP | lsb+1 DOWN |
| 1→0 | 1→0 | 1→1 |
| | 0→1 | 0→0 |
| 0→1 | 1→1 | 1→0 |
| | 0→0 | 0→1 |
FIG. 3
INVENTORS
WAYNE G. SHEAR
JORGE E. ARDILA
SAMUEL ROGER EVERETT
BY William G. Christoforo
ATTORNEY INVENTORS
WAYNE G. SHEAR
JORGE E. ARDILA
SAMUEL ROGER EVERETT
BY
William G. Christoforo
ATTORNEY

INVENTORS

WAYNE G. SHEAR
JORGE E. ARDILA
SAMUEL ROGER EVERETT

BY William G. Christoforo
ATTORNEY

DIGITAL FUNCTION GENERATOR FOR COLLISION AVOIDANCE SYSTEM

BACKGROUND OF THE INVENTION

This invention relates to function generators and more particularly to function generators operating on digital principles wherein the function generated is comprised of a series of straight lines which approximate a desired function.

Altitude rate information is required by an aircraft equipped with a cooperative collision avoidance system for transmission to other cooperating aircraft within the collision avoidance network. The type of aircraft which would normally have onboard cooperative collision avoidance equipment will also normally have aircraft altitude information available in binary form stored in a parallel by bit format in a storage register comprised generally of a multistage flip-flop storage register. Altitude information is digital in 100 foot increments so that if the aircraft climbs 100 feet a binary "1" is added to the storage register, while if the aircraft drops 100 feet a binary "1" is subtracted from the storage register. If time permitted, the number of 100 foot incremental changes that take place in a fixed interval of time could be counted to provide a simple linear relationship between altitude input and altitude rate output. However, since altitude rate information must be available as soon as possible it is necessary to measure the time between single incremental changes of the altitude information for an immediate answer at high rates.

In this case, wherein it is desired to generate a function relating altitude to altitude rate, it is also necessary to determine whether the altitude is increasing or decreasing, that is, in which direction the altitude rate is moving.

SUMMARY OF THE INVENTION

A function generator is described herein which in its most generalized form is capable, through digital techniques, of generating any function which can be approximated by a connected series of straight line segments, and which, in a more specialized form to be shown, will generate the function $$\dot{Z}=S/t$$

where $\dot{Z}$ is altitude rate $S$ is a constant 100 foot altitude increment, and $t$ is time, a variable.

The inventive function generator, in addition to means for initiating and terminating the operation thereof and readout devices, is comprised basically of three elements: a counter, a source of a plurality of timing signals, and gating means responsive to the state of the counter for applying one out of the plurality of timing signals to the counter in proper sequence to permit the counter to generate the desired function. The principle governing operation of the function generator is that a counter when strobed by a constant frequency timing signal will change state linearly with respect to time, thus generating a straight line function segment whose slope is related to the frequency of the timing signal, with slope sign being related to whether the count is increasing or decreasing as the counter is strobed.

It is thus an object of this invention to provide a function generator which can generate any function which can be approximated by a connected series of straight line segments.

It is another object of this invention to provide a function generator to compute altitude rate from altitude.

It is yet another object of this invention to provide a function generator for computing altitude rate from altitude in an aircraft equipped with a cooperative collision avoidance system.

It is still one more object of this invention to provide a function generator of the type described which operates on digital techniques.

BRIEF DESCRIPTION OF THE DRAWINGS

FIG. 3 is a truth table illustrating the principle used in determining the direction of altitude change.

FIG. 4 is a block diagram of a device which determines the direction of altitude change.

FIG. 5 is a block diagram of a timing circuit connecting a collision avoidance system to the function generator herein described.

DESCRIPTION OF THE PREFERRED EMBODIMENT

Figure 1:
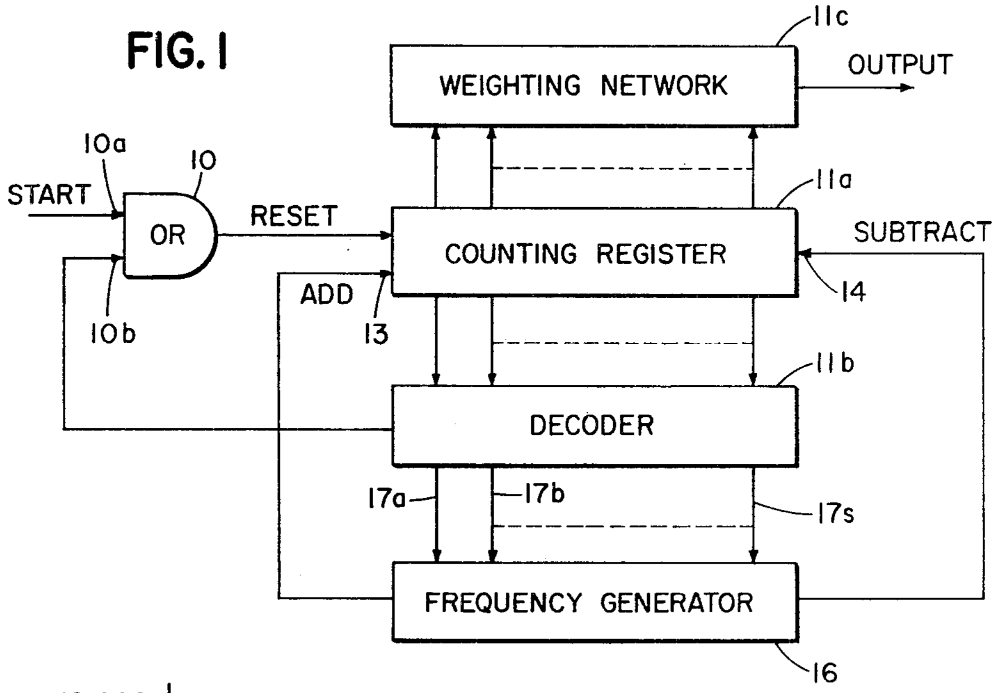
FIG. 1 is a block diagram of a generalized version of the invention.

Referring to FIG. 1, a starting pulse, from a source not shown, is applied to input terminal 10*a* of OR-gate 10 and is used to reset the counting register 11*a* of counter 11 which is additionally comprised of counter decoder 11*b* and weighing network 11*c*. Counting register 11*a* is comprised of a plurality of flip-flop elements connected as a counter and is strobed by timing signals generated by frequency generator 16 at its ADD Terminal 13 or at its SUBTRACT terminal 14. Counting register 11*a* is a binary counting register of the type well known to those skilled in the art which is able to either add one for each timing signal pulse applied to terminal 13 or to subtract one from its total count for each timing signal pulse applied at terminal 14. Decoder 11*b*, also a device well known in the art, briefly, detects the state of each flip-flop comprising counting register 11*a* and is generally comprised of a plurality of AND gates, one of which is opened for each distinct state of counting register 11*a*, so that only a single one of the decoder outputs, for example, 17*a*, 17*b* and 17*s* is energized for a distinctive state of the counting register. A frequency generator 16 is comprised not only of a source of a plurality of timing signals but also gating means controlled by the outputs of decoder 11*b* to direct only one of the timing signals at a time to either counting register input terminal 13 or 14. Counting register 11*a* will thus change state linearly with respect to time at a rate proportional to the frequency of the timing signal applied thereto. Weighing network 11*c* is much like decoder 11*b* in that it senses the state of counting register 11*a*, generally, and particularly senses the state of each of the flip-flops comprising the register. Since counting register 11*a* is changing linearly with respect to time the output from weighing network 11*c* is a straight line segment having a slope proportional to the frequency of the timing signal applied to counting register 11*a* and having a slope sign determined by whether terminal 13 or 14 is energized. Of course, as well known in the art, it is possible to convert the linear changes of state of counting register 11*a* into other than a linear change at the output of the weighing network by the use of various weighing network techniques. However, for the purpose of this description and for the more specific embodiment to follow it is assumed that the weighing network preserves the linearity of the counting register state changes.

Figure 2:
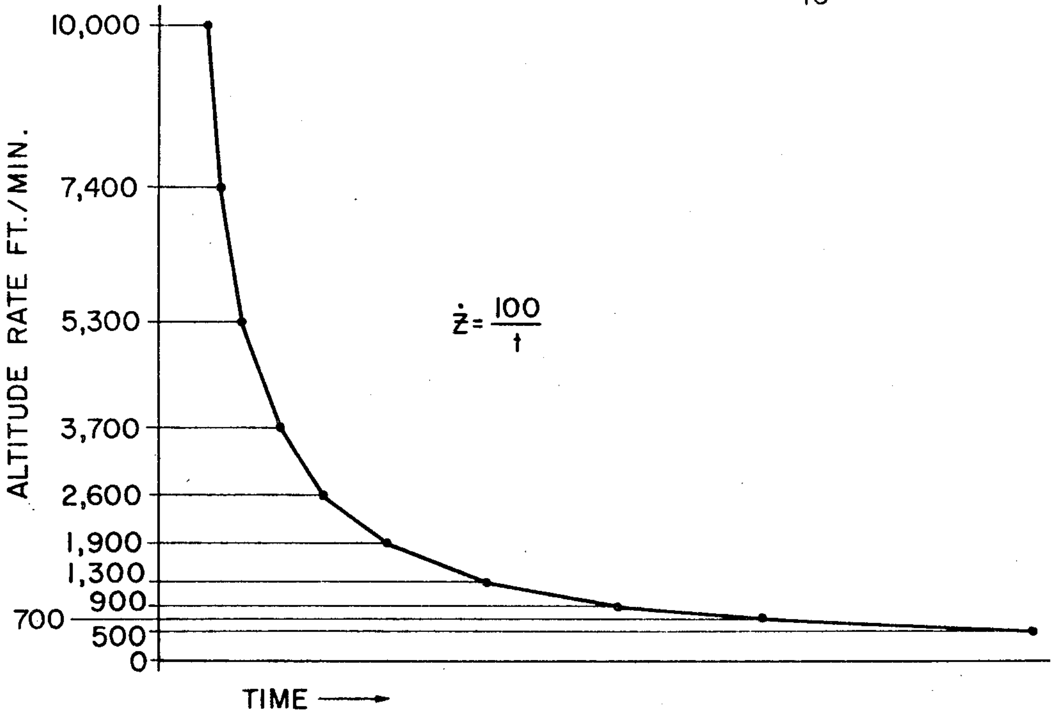
FIG. 2 is a graph of the function $\dot{Z}=S/t$ showing the relationship of altitude and altitude rate and additionally showing how this relationship can be approximated by a connected series of straight line segments.

An aircraft equipped with a cooperative collision avoidance system will normally have altitude information encoded in parallel by bit format in a storage register which changes state at 100 foot increments of altitude. It is also known that at present the maximum altitude rate for aircraft equipped with a cooperative collision avoidance system is 10,000 feet per minute. Thus the minimum delay between changes in the state of the altitude storage register will be 600 milliseconds. It is also known, as aforementioned, that altitude rate $\dot{Z}$ is related to altitude $S$ in constant 100 foot increments by the relationship $\dot{Z}=100/t$. This relationship is shown plotted in the graph of FIG. 2 from an altitude rate of 10,000 feet per minute to an altitude rate of 500 feet per minute, starting with an initial delay of 600 milliseconds. The plot is approximated by nine connected straight line sections being those sections from 10,000 to 7,400 feet per minute, 7,400 to 5,300 feet per minute, 5,300 to 3,700 feet per minute, 3,700 to 2,600 feet per minute, 2,600 to 1,900 feet per minute, 1,900 to 1,300 feet per minute, 1,300 to 900 feet per minute, 900 to 700 feet per minute and 700 to 500 feet per minute. The reason for splitting the plot up in this manner becomes clearer when it is realized that basically the time between successive changes of state of the altitude storage register is to be determined and that a master source of timing signals at 1.5 millisecond period is available from the onboard collision avoidance equipment. As already mentioned, the minimum time for successive changes of state (hereafter designated crossovers) of the altitude storage register is 600 milliseconds, which is a multiple of the 1.5 millisecond signals received from the collision avoidance equipment. Additionally, after the initial 600 millisecond delay, corresponding to the maximum altitude rate, lesser 100 foot per minute increments start at 6 milliseconds each. That is to say, for a 10,000 foot per minute rate the successive pulse is present immediately after the fixed 600 millisecond interval, and for 9,900 feet per minute altitude rate the successive pulse is present approximately one count after the fixed interval if that count occurs 6 milliseconds after the fixed interval. Taking into account the straight line section from 10,000 feet per minute to 7,400 feet per minute it can be seen that this is comprised of 26 increments of 100 foot altitude. Applying the formula $$\dot{Z}=S/t$$

where $\dot{Z}$=7,400 feet per minute
$S$=100 feet, and
$t$=810 milliseconds.

That is, at an altitude rate of 7,400 feet per minute, 100 foot incremental altitude changes occur each 810 milliseconds or 210 milliseconds after the initial 600 millisecond delay. Dividing 210 by 26 it is seen that each 100 foot increment on this straight line section occupies approximately 8.1 milliseconds of the time scale. As previously mentioned the collision avoidance equipment can supply timing pulses at a 1.5 millisecond interval. Thus it is advantageous to adjust this 8.1 millisecond time interval to some exact multiple of 1.5. The closest of such multiple is 7.5 milliseconds and this is taken as the rate of the first line segment for convenience. Also for convenience the rate of succeeding line segments is taken at twice the rate of its preceding line segment, so that the rates of the line segments are respectively 7.5, 15, 30, 60, 120, 240, 480, 960 and 1920 milliseconds.

Referring now to FIG. 4 an altitude storage register 20 comprised of a plurality of flip-flops arranged to count includes a most significant bit (msb) flip-flop, a least significant bit (lsb) flip-flop and a least significant bit + 1 (lsb + 1) flip-flop. As is well known in the counting art, the addition or subtraction of a count from register 20 will always cause lsb to complement while lsb + 1 will complement or not depending upon the state of lsb. This is shown in the truth table of FIG. 3, reference to which should now be made for clarity in explaining how the direction of altitude change is determined. Shown in the truth table is the fact that lsb will change state with every incrementation of the altitude storage register, going from a "1" state to a "0" state or from a "0" state to a "1" state. Assuming that lsb is in the "1" state and altitude increases by a single 100 foot increment, lsb will complement to the "0" state. Similarily, since altitude is increasing, lsb + 1 will also complement. If altitude were decreasing, lsb + 1 would not complement. Assuming now that lsb is initially in a "0" state, lsb + 1 would not complement if altitude were increasing and would complement if altitude were decreasing. Returning now to FIG. 4, incremental changes in the altitude storage register 20 are detected by positive edge detector 22 or negative edge detector 23 which sense the change in state of flip-flop lsb, which as has been mentioned complements with every incremental change of the altitude storage register. The detection of the complementing flip-flop lsb by detector 22 or 23 produces a pulse which proceeds through OR-gate 25 to terminal 26 and defines a crossover of the altitude storage register 20. The crossover pulse also triggers one shot 28 which produces a 1 microsecond output pulse which causes flip-flop 30 to store therein the state of lsb + 1. The one shot 28 output pulse also shifts the information previously contained in flip-flop 30 into flip-flop 32. This latter piece of information has to do with the state of lsb + 1 immediately prior to the current crossover. The state of flip-flops 30 and 32 are sensed by exclusive OR-gate 34 which thus determines whether lsb + 1 is complemented with this crossover. If lsb + 1 has complemented exclusive OR-gate 34 will produce an output, whereas if lsb + 1 has not complemented exclusive OR-gate 34 will not produce an output. Exclusive OR-gate 36 receives as inputs the output of exclusive OR-gate 34 and the state of lsb after the crossover. Thus, if lsb + 1 has complemented and lsb is in the zero state after the crossover, exclusive OR-gate 36 produces an output. From the truth table of FIG. 3 it can be seen that this indicates that altitude is increasing. The output from exclusive OR-gate 36 sets flip-flop 38 so that the terminal 39 is energized, indicating that altitude is increasing. So long as altitude continues to increase flip-flop 38 remains in the set state and terminal 39 remains energized. If, however, altitude should now decrease, a second one-shot 27, triggered by the crossover, produces a 2 microsecond output pulse which resets flip-flop 38, extinguishing the signal on terminal 39 and triggering positive edge detector 42 to generate a pulse which passes through OR-gate 44 and indicates that altitude rate has reversed. If altitude change should again reverse so that altitude is once again increasing, flip-flop 38 would be set by the signal proceeding from exclusive OR-gate 36 so that terminal 39 will once again be energized and positive edge detector 40 will be triggered to produce an output pulse proceeding through OR-gate 44 indicates the altitude reversal.

Referring now to FIG. 5, terminal 26, which is identical to terminal 26 in FIG. 4, receives the crossover signal that sets flip-flop 50 to qualify AND-gate 53. Terminal 52 which is connected to receive the pulses occurring at 1.5 millisecond intervals from the collision avoidance equipment is connected to the second input of AND-gate 53 so that these pulses pass therethrough to a divider 55 which divides the input pulses by 5 to thus generate at its output pulses occurring at 7.5 millisecond intervals. These latter pulses proceed to AND-gate 57, which at the present time, as will be explained, is closed, and to AND-gate 58, which at the present time is open, so that they proceed to divider 60 wherein the pulses are divided by 80 to produce an output pulse after 600 milliseconds. This last pulse, which appears on terminal 65, is also used to set flip-flop 62 thus qualifying gate 57 so that the 7.5 millisecond pulses may now proceed therethrough to terminal 64. It can also be seen that the crossover signal on terminal 26 had initially caused flip-flop 62 to be reset thus closing gate 57 and qualifying gate 58. To summarize the function of the circuit shown in FIG. 5, following a crossover the circuit generates no output until 600 milliseconds thereafter at which time a single pulse appears on terminal 65 and pulses at a 7.5 millisecond rate appear on terminal 64.

Figure 6:
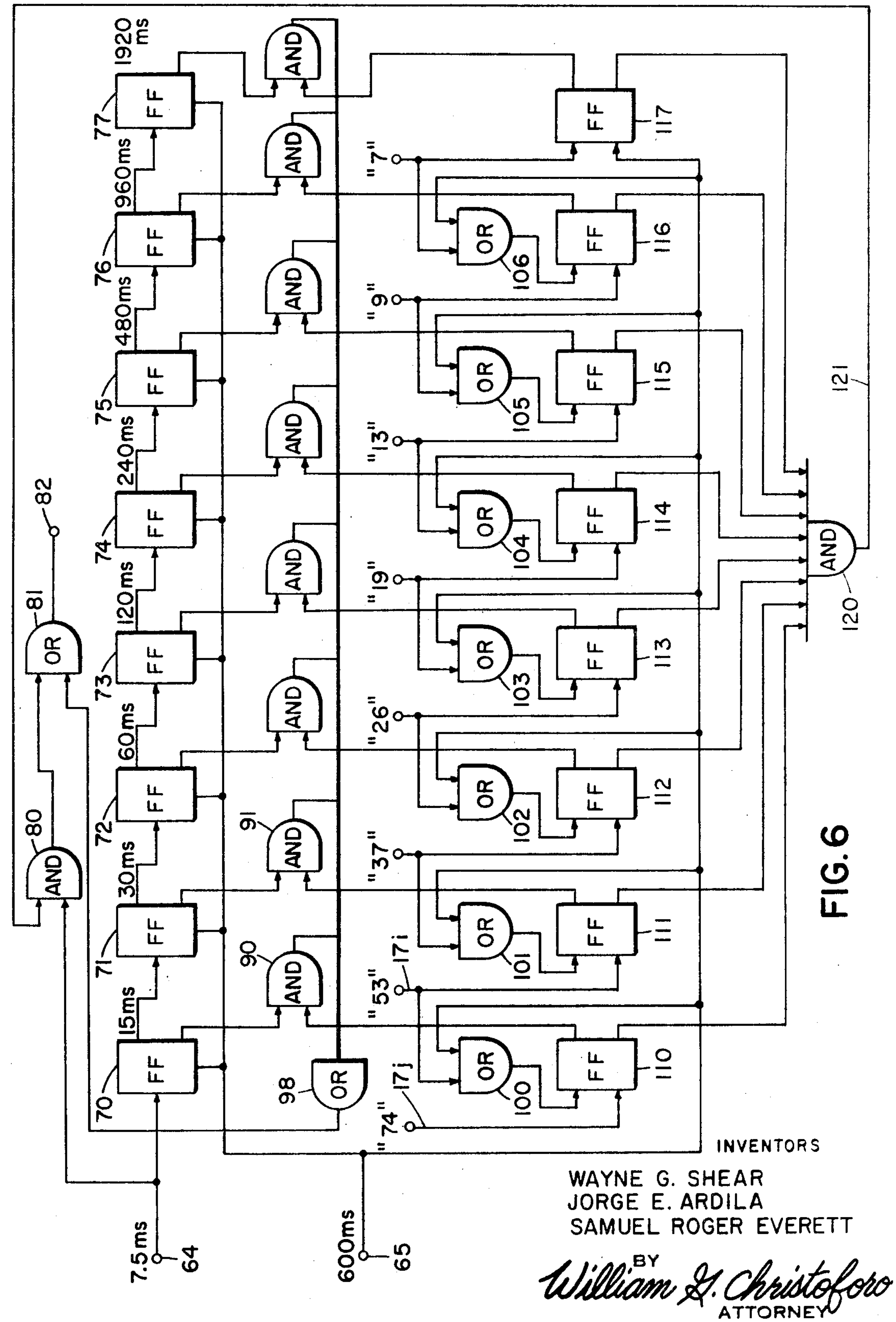
FIG. 6 is a block diagram of a source of multiple timing signals for use in the function generator and gating means for applying these timing signals to the function generator counter.
Figure 7:
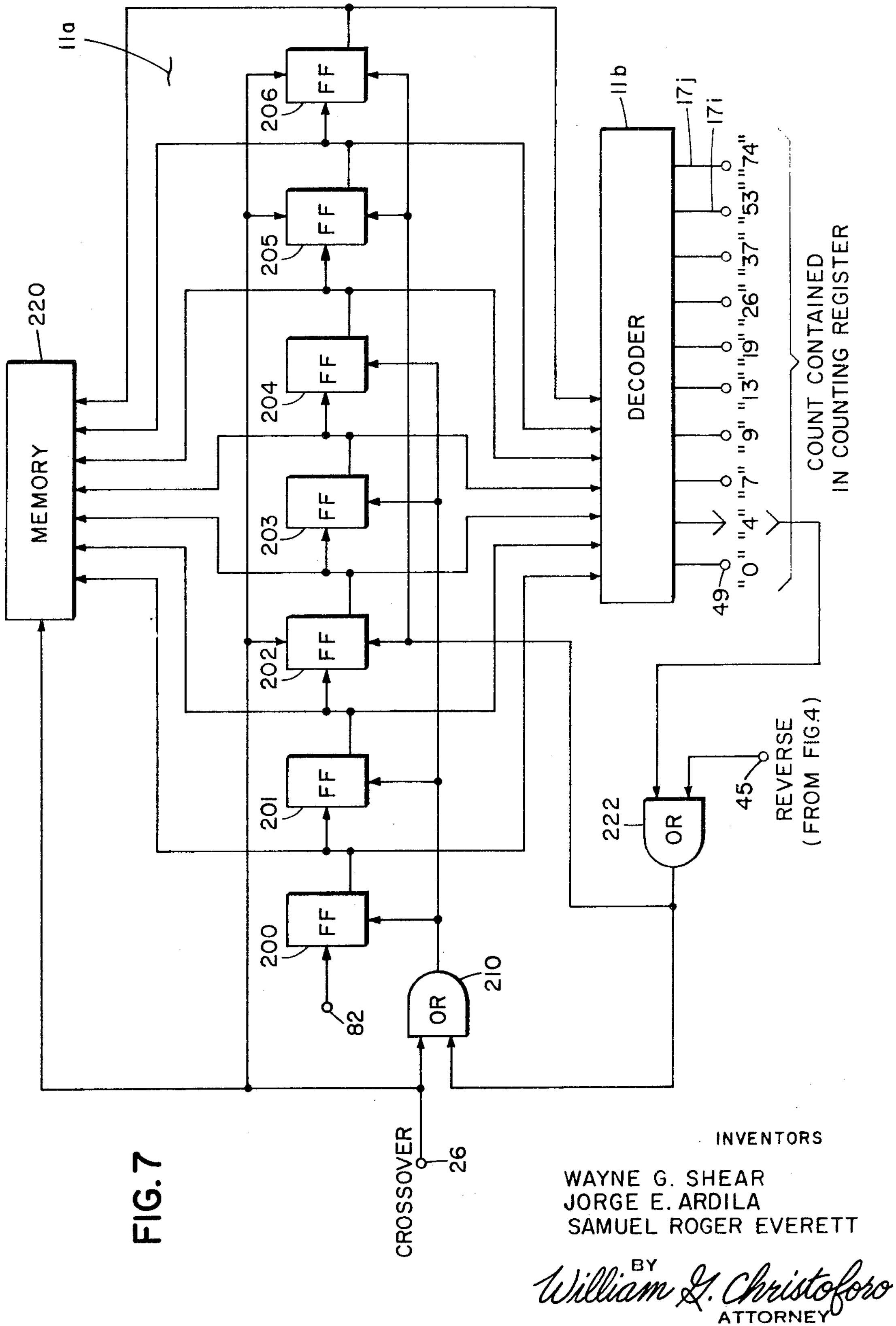
FIG. 7 is a block diagram of the function generator counter.

Referring now to FIG. 6 wherein there is seen a plurality of interconnected dividing flip-flops 70 to 77 which successively divide the pulses appearing at 7.5 milliseconds on terminal 64, this terminal being the same terminal designated 64 in FIG. 5, the aforementioned flip-flops comprising the frequency generating section of the frequency generator 16 seen in FIG. 1. It will be remembered that the pulses occurring at 7.5 millisecond intervals are not impressed upon terminal 64 until 600 milliseconds after a crossover. The single pulse occurring 600 milliseconds after the crossover is impressed on terminal 65, this terminal being identical to terminal 65 of FIG. 5, and is applied through OR-gates 100 to 106 to reset flip-flops 110 to 116, respectively and additionally to reset flip-flop 117 and flip-flops 70 to 77. With flip-flops 110 to 117 in the reset state, AND-gate 120 is open and provides an output along line 121 to qualify AND-gate 80, thus permitting the pulses occurring at 7.5 millisecond intervals to pass therethrough and through OR-gate 81 to terminal 82. Referring now also to FIG. 7 wherein flip-flops 200 to 206 comprise a counting register, similar to counting register 11*a* seen in FIG. 1, which is reset, by the crossover signal, to the binary equivalent of decimal 100 which represents 10,000 feet per minute altitude change. This is accomplished by resetting flip-flops 200, 201, 203 and 204 to the logical "0" state and flip-flops 202, 205 and 206 to the logical "1" state. Pulses appearing on terminal 82, which is identical to terminal 82 of FIG. 6, strobe the counting register so as to count it down one count for each of the timing pulses on terminal 82. If a subsequent crossover signal appears on terminal 26, the instantaneous state of the counting register is transferred into memory 220 which is analogous to the weighing network 11*c* of FIG. 1. In this latter case, memory 220 suitably is comprised of a shift register having the same number of stages as the counting register and a number of gates which are qualified by the crossover signal to transfer the instantaneous state of the counting register into the shift register. Altitude rate information is thus retained in the memory ready for use by the collision avoidance equipment. Decoder 11*b* which is essentially identical to decoder 11*b* shown in FIG. 1 continuously monitors the state of the counting register and should the count contained in the latter register decrease to 74 before a subsequent crossover occurs, decoder output line 17*j* will be energized. Returning now to FIG. 6, it can be seen that when line 17*j* is energized, flip-flop 110 is triggered to the set state thus closing gate 120 and gate 80 so that the pulses appearing at 7.5 millisecond intervals no longer are communicated to terminal 82. However, a flip-flop 110 set signal qualifies AND-gate 90 and thus permits the output of flip-flop 70 to pass therethrough and through OR-gates 98 and 81 to terminal 82 to terminal 82 to thus strobe the counting register comprised of flip-flops 200 to 206 in FIG. 7 with pulses occurring at 15 millisecond intervals. Counting register 11*a* now counts down at this slower rate. If a crossover does not occur before counting register 11*a* reaches the count of 53, decoder 11*b* detects this latter count and energized its output line 17*i* which (referring again to FIG. 6) resets flip-flop 110 through OR-gate 100 and triggers flip-flop 111 to the set state thus holding gates 120 and 80 closed and disqualifying gate 90 and qualifying gate 91. The output of flip-flop 71, that is pulses occurring at 30 millisecond intervals, now pass through this latter gate into OR-gates 98 and 81 to terminal 82 to strobe counting register 11*a* at this still slower rate. It should now be obvious that as long as a subsequent crossover does occur counting register 11*a* will be strobed at progressively slower rates required to generate the curve shown in FIG. 2.

If counting register 11*a* (FIG. 7) reaches the four count before a subsequent crossover occurs, decoder 11*b* at that latter count generates an output signal which proceeds through OR-gate 222 to flip-flops 202, 205 and 206 and through OR-gate 210 to the remaining flip-flops of the counting register to return the counting register to a "0" state condition. The "0" state condition is interpreted by decoder 11*b* to energize terminal 49 which is also seen in FIG. 5 to reset flip-flop 50 so that AND-gate 53 is disqualified and the system returns to an inactive state in an identical manner as when a reverse signal appears on terminal 45, terminal 45 of FIGS. 4 and 7 being identical.

The invention claimed is:

1. A function generator for computing the pulse repetition frequency between adjacent pulses in a pulse train comprising:

means for generating a crossover signal upon detection of each said pulse;

counting means reset to a predetermined initial state by said crossover signals, said counting means being strobed by timing signals;

means for generating a plurality of said timing signals, each having a predetermined frequency;

gating means responsive to the instantaneous state of said counting means for applying one out of said plurality of timing signals to said counting means; and, means responsive to said crossover signals for determining the instantaneous state of said counting means.

2. A function generator as recited in claim 1 wherein said pulses are generated by the change of state of a digital altimeter and wherein said means for generating a crossover signal comprises a pulse edge detector.

3. A function generator as recited in claim 2 with additionally means responsive to the change of state of the least significant bit and the least significant bit +1 contained in said altimeter for determining whether said altitude is increasing or decreasing.

4. A function generator as recited in claim 1 wherein said means for determining the instantaneous state of said counting means comprises a memory means for reproducing therein in response to said crossover signal said instantaneous state of said counting means.

5. A function generator as recited in claim 4 wherein said counting means comprises a binary counter with the count therein being arranged in parallel by bit format.

6. A function generator as recited in claim 5 wherein said timing signal generator comprises a plurality of digital dividers for deriving said plurality of timing signals from a single master timing signal.

7. Means for instantaneously calculating the rate of altitude change of an aircraft wherein end point signals are produced at the end points of predetermined standard altitude increments, comprising:

counting means for counting pulses and which is reset to a predetermined initial state by each of said end point signals;

a source of pulses to be counted by said counting means, the pulse repetition frequency of said pulses being related to the count contained in said counting means; and, means responsive to said end point signals for determining the instantaneous state of said counting means, said state as determined being said rate of altitude change.

8. Means as recited in claim 7 with additionally means for determining whether said altitude is increasing or decreasing.

9. Means as recited in claim 7 wherein aircraft altitude is stored in binary form in a binary counter, the number in said binary counter increasing when said altitude changes a fixed incremental amount in one direction and the number in said binary counter decreasing when said altitude changes a fixed incremental amount in the other direction, said calculating means additionally including means examining the state and change of state of the least significant bit and least significant bit plus one for generating a signal indicative of whether said altitude as stored in said binary counter is increasing or decreasing.

* * * * *